(12) United States Patent
Kong et al.

(10) Patent No.: US 6,326,068 B1
(45) Date of Patent: Dec. 4, 2001

(54) MULTI-LAYER HERMETICALLY SEALABLE FILM

(75) Inventors: Dan-Cheng Kong; Richard A. Rehkugler; Donald F. Sexton, all of Fairport, NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/435,559

(22) Filed: Nov. 8, 1999

(51) Int. Cl.$^7$ ..................................................... B29D 22/00
(52) U.S. Cl. ....................... 428/35.2; 428/35.3; 428/35.7; 428/35.8; 428/35.9; 428/213; 428/220; 428/349; 428/461; 428/516; 428/910
(58) Field of Search ................................. 428/98, 174, 195, 428/200, 204–206, 209, 215, 220, 516, 910, 349, 461, 35.2, 35.3, 35.7, 35.8, 35.9

(56) References Cited

U.S. PATENT DOCUMENTS

| | | | |
|---|---|---|---|
| 5,049,436 | 9/1991 | Morgan et al. ....................... | 428/213 |
| 5,326,625 | 7/1994 | Schuhmann et al. ................. | 428/215 |
| 5,376,437 | 12/1994 | Kawakami et al. ................... | 428/216 |
| 5,527,608 | 6/1996 | Kemp-Patchett et al. ............ | 428/349 |
| 5,639,537 | 6/1997 | Ebara et al. .......................... | 428/147 |
| 5,847,042 | * 12/1998 | Hosoda et al. ........................ | 524/506 |
| 5,888,648 | 3/1999 | Donovan et al. ..................... | 428/349 |

* cited by examiner

*Primary Examiner*—Bruce H. Hess
*Assistant Examiner*—Ling Xu
(74) *Attorney, Agent, or Firm*—Dennis P. Santini

(57) ABSTRACT

A multi-layer film has an improved composite structure for providing hermetic seals to packages manufactured in high speed packaging apparatus. The structure of the multi-layer film includes layers A/B/C/D. Skin layer A is formed from polypropylene copolymer with melt flow rate greater than one or linear high density polyethylene with melt index greater than one. Core layer B is formed from polypropylene. Intermediate layer C has the primary function of compliance during sealing, and sealing layer D has the primary function of providing adhesivity to the completed seal. The sealing layer D includes an antiblocking agent comprising non-distortable organic polymer particles having an average particle size greater than 6 microns

11 Claims, No Drawings

MULTI-LAYER HERMETICALLY SEALABLE FILM

The present invention relates to the art of packaging using multi-layer films, and, in particular, to a new composite multi-layer film for providing hermetic seals to multi-layer film packages.

Packaging technology has over the years required the development of many disciplines. Currently, packaging technologies integrate elements of engineering, chemistry, food science, metallurgy, and other technologies in order to provide the consumer fresh, health food product. In those cases where packages are prepared from multi-layer film, it is desirable to be able to provide a hermetic seal, i.e., a seal which does not permit passage of gas such as air.

In recent years, containers produced out of multiple-layer flexible film, such as bags and pouches, predominate the marketplace. In order to utilize continuous multiple-layer flexible film, the industry generally employs form/fill/seal packaging techniques. The type of product packaged dictates whether or not the technique will include horizontal form/fill/seal packaging (HFFS) or vertical form/fill/seal packaging (VFFS).

It is important for the packaging artisan to be able to select a multi-layer film having optimum barrier properties for storage of the food items and be confident of providing a high quality seal using high speed packaging apparatus. For example, it is known that stereoregular polypropylene, e.g., oriented polypropylene, is quite useful in the manufacture of packages from flexible films. Using oriented polypropylene as a core layer, additional layers in the way of coatings, co-extrusions, laminations, and combinations thereof are added to improve barrier properties of the film. In certain cases, films can be prepared which exclude moisture and oxygen, but permit the passage of light. In other cases, it is also important to prevent light from passing through the film barrier. Barrier properties can also be modified and/or enhanced by treatments such as heat and flame treatment, electrostatic discharge, chemical treatments, halogen treatment, ultraviolet light, and combinations thereof A primary concern for designing multiple-layer films for packaging is to ensure they can be processed on high speed form/fill seal machinery. Form/fill/seal package apparatus operates by unwinding continuous film from bulk film rolls, followed by forming pouches therefrom, filling the pouches, and finally, sealing the pouch closed. Thus, the film must have sufficient flexibility to undergo machine folding from a flat orientation to a folded condition, and be subjected to a sealing function which is part of high-speed packaging apparatus. In selecting the optimum multi-layer film for its barrier properties, high-speed unrolling and folding are the primary concern. An additional, and very important aspect of the packaging process, however, is the ability to effectively seal the pouch after it is filled with the product.

High-speed horizontal and vertical form/fill/seal apparatus include sealing functions at various stages of the packaging process. In a horizontal form/fill/seal apparatus, individual pouches are formed by folding the multi-layer film in half followed by providing vertical seals along the length of the folded web and separating the pouches along the seals formed by vertical sealing. (Optionally, the bottoms of the pouches can also be sealed). After the pouch thusly formed is filled, the top of the pouch is sealed.

Similarly, in vertical form/fill/seal apparatus, the continuous web is formed around a tube and the web is immediately joined together by a longitudinal sealing jaw as either a lap seal or a fin seal. Lap seals and fin seals are depicted in U.S. Pat. No. 5,888,648.

A second sealing function is present in a VFFS configuration which consists of a combination top- and bottom-sealing section (with a bag cut-off device in between). The top-sealing portion seals the bottom of an empty bag suspended from the bag forming tube while the bottom portion seals the top of a filled bag.

In order, therefore, to provide high-barrier multi-layer film with hermetic seals, several factors must be considered. It is important to provide a sealing capability at as low a temperature as possible in order to retain, among other things, stereoregularity imposed during orientation, little or no film shrinkage, retention of film and/or chemical additive properties, and highly consistent quality sealing capabilities. Furthermore, the film must have surface characteristics which permit it to be readily used on high-speed machinery. For example, the coefficient of friction must be such that it can be readily unrolled from a high volume roll of film and passed through the packaging machinery. Undesirable sticking or friction characteristics can cause bag imperfections and interruption of high-speed processing. Moreover, seals formed during process must have good seal strength.

More recently, the packaging artisan has been concerned with the ability to provide quality seals which preserve the freshness of the contents while providing the consumer with an easily openable and reclosable container. Innovations to date have been primarily concerned with the components of the seal material. For example, U.S. Pat. No. 3,202,528 describes an oriented polypropylene film having an adherent heat-sealable coating which includes a material from the group consisting of copolymers of vinylidene chloride and acrylonitrile, copolymers of vinyl chloride with vinyl acetate, chlorinated rubbers, nitrocellulose and polyamide which melts below 160° C. and an acidic material provided in an amount of about 20 to about 60% by weight of the film forming material. This adhesive is coated and dried on the film. U.S. Pat. No. 4,020,228 describes a gel composition which provides a heat sealable surface to polyolefinic materials or cellulosic sheet materials. U.S. Pat. No. 4,121,956 discloses an ionomer adhesive adhered to an outer ionomeric surface of package wrapping for attachment of labels.

U.S. Pat. No. 4,218,510 discloses a heat-sealable multi-layer film having a polyester layer chemically interfacially bonded to a polyolefinic layer which contains 250 to 750 parts per million of a fatty acid amide.

U.S. Pat. No. 4,292,882 discloses an oriented heat-sealable anti-static polypropylene film manufactured by applying to a surface of a base polypropylene film a heat-sealable olefinic polymer containing between 0.2 and 10% by weight of an anionic hydrocarbyl sulfonate. Andrews, et al. also provide that a slip agent can be incorporated for ease of handling.

U.S. Pat. No. 4,389,450 describes a multi-layer packaging film in which the outer polymeric layers cooperate to provide a relatively constant coefficient of friction differential. This enhances the ability to use the film in high speed processing to form fin seal and lap seals.

U.S. Pat. No. 5,049,436 discloses a multi-layer film which is hermetically heat sealable over a broad temperature range. This patent describes a heat-sealable layer which includes an ethylene-propylene copolymer and/or an ethylene-propylene-butene terpolymer with an inorganic anti-block agent and a fatty acid amide.

U.S. Pat. No. 5,376,437 describes a three-layer, heat sealable film having a base layer of biaxially oriented, crystalline polypropylene, a cushion layer of an olefin polymer lower in melting point than the base layer, and a heat-sealable layer of an olefin polymer. The various layers of this film have particular degrees of surface orientation.

U.S. Pat. No. 5,527,608 describes a biaxially oriented heat sealable multilayer film which has a core substrate of a polyolefin homopolymer. On one surface of the core substrate is a layer of a block copolymer of ethylene and propylene having a melt flow ratio (MFR) of 1 to 10. A high density polyethylene layer may be placed on the other surface of the core substrate, and a heat sealable layer may be placed over the block copolymer layer. The heat sealable layer may be formed from a terpolymer of ethylene, propylene and butene-1, a random copolymer of ethylene and propylene, a random copolymer of propylene and butene-1 or blends thereof.

U.S. Pat. No. 5,888,648 describes a multi-layer, hermetically sealable film. The main film substrate may be oriented polypropylene, optionally having a layer of high density polyethylene on one surface of the polypropylene. On the surface of the polypropylene opposite the high density polyethylene layer is an intermediate layer of polyethylene homo-, co- and terpolymers, amorphous nylon, ionomers or mixtures thereof. A preferred polymer in the intermediate layer is low density polyethylene. On the exterior surface of the intermediate layer is a sealing layer of e.g., polyethylene homo-, co- and terpolymers, amorphous nylon, ionomers or mixtures thereof.

Although there are a variety of hermetically sealable, multi-layer films, there remains a need for such films which can be formed into packages at high rates of speed, while still forming sufficient hermetic seals, especially within a broad range of sealing temperatures.

The present invention provides an improved multi-layer films which can be formed into packages at high rates of speed, while still forming sufficient hermetic seals, especially within a broad range of sealing temperatures.

SUMMARY OF THE INVENTION

There is provided a multi-layer film for forming hermetic seals on packages comprising:

(a) layer A of polypropylene copolymer with melt flow rate greater than one or linear high density polyethylene with melt index greater than one;

(b) layer B of polypropylene;

(c) layer C of deformable random copolymer which is sufficiently deformable under heat seal conditions, said deformable random copolymer being selected from ethylene-propylene copolymer, ethylene-propylene-butene-1 terpolymer, propylene-butene copolymer, and mixtures thereof; and (d) layer D or heat sealable polymer with a melting point equal to or lower than layer C polymer, said heat sealable polymer being selected from ethylene-propylene copolymer, ethylene-propylene-butene-1 terpolymer, propylene-butene copolymer, and mixtures thereof, wherein layer C is thicker than layer D; wherein layer D is loaded with an antiblocking agent comprising non-distortable organic polymer particles having an average particle size greater than 6 microns; and wherein the film layer order is A/B/C/D).

DETAILED DESCRIPTION OF THE INVENTION

The present invention provides a multi-layer film and a method of improving multi-layer films whereby hermetic seals can be simply and efficiently formed and whereby excellent seal characteristics are achieved.

The present invention includes a core layer B of oriented polypropylene. It is noted that such a polypropylene layer B alone (without additional layers) characteristically has a stiffness or modulus which prevents or significantly reduces the ability to seal the film together where the film is bent to form overlaps or fins. In a preferred embodiment the layered film has good barrier properties and can include a metallized film layer. For example, the layered film can include one or more additional layers selected from the group consisting of oriented polypropylene, ethylene-propylene copolymers, polyethylene terephthalate, polyamide, polyacrylonitrile copolymer, polyvinylidene chloride, fluoro-polymers, ethyl-vinyl alcohol copolymers, and mixtures thereof. Other layers can be barrier resins, tie resins, metallized film, ceramic deposited film (e.g., $SiO_4$), plasma chemical vapor deposited film, and metal, ceramic, plasma chemical vapor.

The layered film may be laminated through skin layer A to additional outer webs, such as oriented polypropylene (OPP), polyethylene terephthalate (PET), polyamide, polyethylene, and other mono- or multi-layer films. Layer A can also be metallized and then laminated, through the metal layer, to other films, such as a multi-layer biaxially oriented polypropylene film.

Layers C and D provide a sealing function and are bonded to layer B. These layers include an intermediate layer C, which is directly bonded to layer B, and a sealing layer D bonded to the intermediate layer C.

As suggested in U.S. Pat. No. 5,888,648, the intermediate layer should have sufficient thickness and should have sufficient flow property under sealing conditions to deform and comply with all unfilled space between the sealing jaws during sealing. The term "comply" means to be easily and inelastically forced to occupy all empty space remaining between sealing jaws while the sealing jaws are in the closed or seal position. Polyethylene or polypropylene co- and terpolymers are contemplated for use in the intermediate layer C. The intermediate layer C material should flow under heat and pressure imposed by jaws of commercial sealing apparatus to occupy all the space between the jaws.

The sealing layer D can contain a component which readily forms a seal under sealing heat and pressure conditions. Such components include polyethylene or polypropylene, co-, and terpolymers, and mixtures thereof.

The sealing layer D is loaded with an antiblocking agent comprising non-distortable organic polymer particles having an average particle size greater than 6 microns. This non-distortable organic polymer of the antiblocking agent may be a copolymer of methyl methacrylate and propylidene trimethacrylate. The particle size of this non-distortable organic polymer may be from 6 microns to 15 microns, preferably from 8 microns to 12 microns, particularly about 10 microns. A particular example of such a non-distortable organic polymer is Epostar 1010, sold by Nippon Shokubai, which is composed of spherical, cross-linked copolymers of methyl methacrylate and propylidene trimethacrylate with a particle size (i.e. average diameter) of about 7–11 microns.

By the term "non-distortable" it will be understood that the particles essentially retain their shape (preferably spherical or essentially spherical) throughout the film forming process, including extruding and stretching. Therefore, preferred organic polymeric particles include those which are essentially non-meltable under film forming conditions. Examples of such organic polymeric particles include cross-linked polymers, such as cross-linked acrylic polymers.

Such cross-linked acrylic polymers may include non-acrylic comonomers, such as styrene. Examples of antiblocking agents formed from cross-linked polymers are described in U.S. Pat. No. 5,639,537.

The loading of the non-distortable organic particles in the sealing layer D may be from 1000 ppm to 20,000 ppm, preferably from 3000 ppm to 15,000 ppm, particularly from 5000 ppm to 10,000 ppm.

The antiblocking agent of layer D may further comprise inorganic particles, such as solid oxides, having an average particle size greater than 2 microns. These inorganic particles of the sealing layer D may be composed of silica ($SiO_2$), metal carbonates (including alkali metal carbonates, such as calcium carbonate), metal silicates (including alkali metal silicates, such as magnesium silicate, and other metal silicates, such as aluminum silicate), metal phosphates (including alkali metal phosphates, such as calcium phosphate), clays, talc, diatomaceous earth, glass and the like.

Examples of inorganic blocking materials include the Syloids, available from W. R. Grace Davison Division, synthetic amorphous silica gels having a composition of about 99.7% $SiO_2$ and a particle size of about 2–4 microns, particularly Syloid 244, having a particle size of about 2.0 microns.

Also useful are Super Floss, from World Minerals, a diatomaceous earth of the composition $SiO_2$ 92%, $Al_2O_3$ 44%, $Fe_2O_3$ 1.2%, having an average particle size of about 5.5 microns; and synthetic precipitated silicates such as Sipernat 44, available from Degussa Corporation of Akron Ohio, having a composition of $SiO_2$ 42%, $Al_2O_3$ 36%, $Na_2O$ 22% and having a 3.5 micron mean particle size.

The particle size of the optional inorganic particles of the antiblocking agent may be from 1 microns to 15 microns, preferably from 2 microns to 8 microns, particularly about 4 microns.

The loading of the inorganic particles in the sealing layer D may be from 600 ppm to 5,000 ppm, preferably from 1,000 ppm to 3,000 ppm, particularly from 1,500 ppm to 2,500 ppm.

The polypropylene of layer B may be the homopolymer Fina 3371 sold by the Fina Oil Company. The polypropylene of layer B may be a homopolymer or a copolymer. Propylene homopolymers for layer B include isotactic polypropylene, preferably 80–100% isotactic polypropylene, most preferably about 95% isotactic polypropylene. The propylene homopolymers preferably have a melt flow (measured in accordance with the standard ASTM D1238 method) ranging from about 1.2 to about 10 g/10 minutes, most preferably from about 2.5 to about 6 g/10 minutes. Particular propylene copolymers include (98–93)/(2–7) propyleneethylene copolymers.

The linear high density polyethylene may have a density of greater than 0.94 g/cc, e.g, about 0.941 to about 0.965 g/cc. It is well known that the density of polyethylene is decreased by copolymerizing ethylene with other olefins, especially those having four or more carbon atoms. Therefore, it will be understood that preferred linear high density polyethylenes are free or substantially free of other comonomers. It is also well known that linear high density polyethylenes can be prepared with a variety of coordination-type catalysts.

As described in U.S. Pat. No. 5,929,128, linear high density polyethylene is essentially free of long chain branching.

The polypropylene copolymer of layer A may be a copolymer of propylene with one or more olefins, such as ethylene and $C_4$ to $C_{10}$ alpha-olefins. Such polypropylene copolymers may include at least 80 mole % of propylene.

The layer C thickness may be from 3 microns to 15 microns, preferably from 5 microns to 12 microns, particularly from 7 microns to 10 microns.

The layer D thickness may be less than 4 microns, preferably from 2 microns to 4 microns, particularly from 1 micron to 2 microns.

The layer B thickness may be from 8 microns to 25 microns, preferably from 10 microns to 20 microns, particularly from 11 microns to 17 microns.

The layer A thickness may be from 0.5 microns to 5 microns, preferably from 1 microns to 2 microns, particularly from 0.5 microns to 1 microns.

The multi-layer film comprising layers A, B, C, and D may be uni-axially or bi-axially oriented.

Layer C and D may have a thickness of from about 15% to about 70% of the total thickness of layers A, B, C and D, for example, from about 20% to about 60% of this total thickness.

The thickness of the intermediate layer C may be from about 10% to about 90% of the total thickness of layers C and D, for example, from about 40% to about 80% of this total thickness.

The present invention provides a multi-layer film which is hermetically sealable and a method of improving the seal characteristics of multi-layer films which are hermetically sealable in high-speed packaging machines. In order to provide a hermetic seal to packages formed from multi-layer films, care must be taken to provide a sealing medium which accommodates the nature of the barrier film used for the package, i.e., its modulus or stiffness, thickness, adversity to temperature and pressure imposed under sealing conditions, etc. "Hermetic seals" as used herein means both peelable and unpeelable seals which provide hermetic barrier properties, i.e., does not permit passage of a gas.

As pointed out in U.S. Pat. No. 5,888,648, two separate layers may be used to provide a sealing function. Each layer is primarily designed to fulfill one of the required sealing functions, and certain imperfections in hermetic seals normally associated with high-speed film packaging can be avoided. Specifically, an "intermediate layer" primarily meets the requirement of "compliance" throughout the volume between the surfaces of sealing jaws of high-speed packaging apparatus during the sealing function. The "sealing layer", on the other hand, primarily meets the requirement of providing high performance adhesion under sealing conditions. Bearing in mind that sealing conditions include both high temperature and pressure imposed on the sealant layer, both the intermediate layer and the sealing layer will participate in both of the sealing functions, i.e., compliance and adhesion. However, the primary function of the intermediate layer is to provide compliance while the primary responsibility of the sealing layer is to provide adhesivity. Thus, the composition of the intermediate layer is usually different from the composition of the sealing layer.

Since the primary function of the intermediate layer is compliance between the sealing jaws, the intermediate layer should have two attributes to fulfill its function, sufficient thickness and a flow property to comply with the space between the jaws. "Compliance" in the context of the present disclosure means the ability to be easily and non-elastically deformed to fill and conform to the entire space between the sealing surfaces of a sealing jaw. Sealing jaws can operate from a temperature of from about 120° C. to about 190° C., and normally are imposed on a film packaging material at a pressure of from about 120 psi to about 180 psi.

Sealing jaws are illustrated and described in U.S. Pat. No. 5,888,648. Sealing jaws can be flat, or, in many cases, are provided with teeth. A complementary jaw is used in conjunction with a sealing jaw such that the teeth of the sealing jaw mesh with the valleys the complementary jaw. The surfaces of the jaws close in the sealing position on two multi-layer films, thereby clamping the films therebetween. To form a hermetic seal, the volume between the surfaces must be completely filled during sealing. These are the normal sealing conditions under which the intermediate layer must be capable of compliance.

The intermediate layer should have sufficient material to undergo compliance without leaving a void. Thus, the thickness of the intermediate layer should be such that a continuum of material is provided throughout the space between the surfaces of the sealing jaw. The flow property of the intermediate layer should be such that in the presence of the temperature and pressure exerted during sealing, the material maintains a viscosity which is easily deformed but maintains a non-interrupted mass throughout the space between the sealing surfaces.

Random copolymers of ethylene and propylene or a random terpolymer of ethylene-propylene-butylene (EPB) have been found to be excellent components for intermediate layer C. These components are inexpensive and have the correct compliance requirements for intermediate layer C. These components can be used alone or in combination with other components, such as linear low density polyethylene.

The sealing layer D, in turn, has the primary responsibility of providing adhesivity. Thus, the components of sealing layer D should be selected based on their ability to provide good adhesive seal strength, i.e., adequate tensile strength of the seal. Inasmuch as the primary function of the sealing layer is that of adhesivity, the thickness of the sealing layer D is less than the thickness of the intermediate layer C. It has been found that ethylene-propylene random copolymers, ethylene-propylene-butene random terpolymers, and propylene-butene copolymer are excellent for use as the primary component in the sealing layer D. The sealing layer D is loaded with organic and, optionally, inorganic antiblocks to facilitate film machinability.

EXAMPLE 1

A laminated film structure is prepared from a four layer coextruded biaxially oriented film having layers A, B, C, and D. Layer A of the four layer film is laminated with adhesive to biaxially oriented polypropylene film product (Mobil's 80 MB400). The four layer film is of the structure A/B/C/D, in which the skin layer A of the film is HDPE about 0.8 um thickness, the core layer B of the film is polypropylene about 11 um thickness, the intermediate layer C of the film is 9 um thickness of ethylene-propylene-butene-1 terpolymer having DSC melting point at 131° C., and the sealable skin layer D of the film is 1 um thickness of ethylene-propylene-butene-1 terpolymer having DSC melting point at 126° C. loaded with 2400 ppm $SiO_2$ about 4 microns size and 6000 ppm Epostar 1010, available from Nippon Shokubai Co., Ltd., which is a cross-linked copolymer of methylmethacrylate and propylidene trimethacrylate with average particle size about 10 microns.

The laminated film is evaluated by using a vertical form fill and seal machine, Fuji FW7700, at the speed of 55 packages per minute. Empty bags at the size 5"×7½" filled with air are sealed at the specified temperatures for fin seal at the back of the bag and crimp seal on both ends of the bag. The bags are put under water vacuum at 10 inches mercury. If there are no bubbles observed, the seal is considered hermetic seal or no leak. From crimp seal and fin seal temperatures combination, the data are generated to obtain the hermetic seal range (i.e. There is no leak in these temperature range). Hermetic seal range for the above laminated structure is observed when fin seal temperature is from 260° F. to 280° F. and crimp seal temperature is from 260° F. to 290° F.

EXAMPLE 2

A laminated film structure is prepared from four layer coextruded biaxially oriented film having layers A, B, C, and D. Layer A of the four layer film is laminated with polyethylene to an oriented polypropylene film (Mobil's 80MB400). The four layer coextruded biaxially oriented film is the same structure as Example 1. The laminate is run through the same packaging machine and same speed as Example 1. Hermetic seal range for the laminate is observed when fin seal temperature is from 250° F. to 290° F. and crimp seal temperature is from 260° F. to 290° F.

EXAMPLE 3

A laminated film structure is prepared from four layer coextruded biaxially oriented film having layers A, B, C, and D. Layer A of the four layer film is laminated with polyethylene to an oriented polypropylene film (Mobil's 70 SPW-L). The four layer coextruded biaxially oriented film is the same structure as Example 1. The laminated film is evaluated by using a vertical foam fill and seal machine, Hayssen Ultimum II, at the speed 55 packages per minute. Empty bags at the size 5"×7½" filled with air are sealed at the specified temperatures for lap seal at the back of the bag and crimp seal on both ends of the bag. Hermetic seal range is observed when lap seal temperatures is from 260° F. to 330° F. and crimp seal temperature at 310 ° F., and lap seal temperature is from 280° F. to 330° F. and crimp seal temperature at 300° F.

EXAMPLE 4

A metallized four layer coextruded biaxially oriented film is evaluated. The aluminum vacuum deposition is applied on the skin layer A of the structure A/B/C/D which is the same four layer coextruded biaxially oriented film structure as Example 1. This metallized film is further printed with ink on the top of aluminum layer and a heat resistance lacquer layer is coated on the top of the ink. The final layer structure is (heat resistance lacquery)//ink//(vacuum metallized aluminum)//HDPE//Polypropylene//EPB-terpolymer (I)//EPB-terpolymer (II), where EPB-terpolymer (I) is 9 um thickness of ethylene-propylene-butene-1 terpolymer having DSC melting point at 131° C., and EPB-terpolymer(II) is 1 um thickness of ethylene-propylene-butene-1 terpolymer having DSC melting point at 126° C. loaded with 2400 ppm $SiO_2$ about 4 microns size and 6000 ppm Epostar 1010, available from Nippon Shokubai Co., Ltd., which is a cross-linked copolymer of methylmethacrylate and propylidene trimethacrylate with average particle size about 10 microns. This over-lacquered, printed, and metallized film is run through horizontal form fill and seal machine, Doboy, at the speed 86 feet per minute or 172 packages per minute. Empty bags filled with air are generated. The hermetic seal range evaluation procedure is the same as Example 1. A hermetic seal range is observed when the crimp seal temperature is from 240° F. to 320° F. and fin wheel temperature is set at 320 ° F.

What is claimed is:

1. A multilayer film for forming hermetic seals on packages comprising:
    (a) layer A of polypropylene copolymer with melt flow rate greater than one or linear high density polyethylene with melt index greater than one;
    (b) layer B of polypropylene;
    (c) layer C of deformable random copolymer which is sufficiently deformable under heat seal conditions, said deformable random copolymer being selected from ethylene-propylene copolymer, ethylene-propylene-butene-1 terpolymer, propylene-butene copolymer, and mixtures thereof; and
    (d) layer D of heat sealable polymer with a melting point equal to or lower than layer C polymer, said heat sealable polymer being selected from ethylene-propylene copolymer, ethylene-propylene-butene-1 terpolymer, propylene-butene copolymer, and mixtures thereof
    wherein layer C is thicker than layer D; wherein layer D is loaded with an antiblocking agent comprising non-distortable organic polymer particles having an average particle size greater than 6 microns; and wherein the film layer order is A/B/C/D.

2. The film of claim 1, wherein the antiblocking agent of layer D further comprises inorganic particles having an average particle size greater than 2 microns.

3. The film of claim 2, wherein the non-distortable organic polymer of the antiblocking agent is a cross-linked copolymer of methyl methacrylate and propylidene trimethacrylate, and wherein the average particle size of the non-distortable organic polymer particles is from 6 microns to 15 microns.

4. The film of claim 2, wherein the loading of the non-distortable organic polymer particles in layer D is from 1000 ppm to 20,000 ppm, and wherein the average particle size of the non-distortable organic polymer particles is from 8 microns to 12 microns.

5. The film of claim 4, wherein the layer C thickness is from 3 microns to 15 microns, wherein the layer D thickness is less than 4 microns, wherein the layer B thickness is from 8 microns to 25 microns, and wherein the loading of the non-distortable organic polymer particles in layer D is from 3000 ppm to 15,000 ppm.

6. The film of claim 5, wherein the layer C thickness is from 5 microns to 12 microns, wherein the layer D thickness is from 1 microns to 4 microns, and wherein the layer B thickness is from 10 microns to 20 microns.

7. The film of claim 6, wherein the film is uni-axially or bi-axially oriented.

8. The film of claim 7, wherein the film is hermetically sealable in a machine for making packaging bags with a combination of a fin seal and crimp seals or a combination of a lap seal and crimp seals.

9. The film of claim 8, wherein the film is metallized.

10. The film of claim 9, wherein the layer C thickness is from 7 microns to 10 microns, wherein the layer D thickness is from 1 microns to 2 microns, and wherein the layer B thickness is from 11 microns to 17 microns.

11. A multi-layer packaging bag with a combination of a fin seal and crimp seals or a combination of a lap seal and crimp seals comprising:
    (a) layer A of polypropylene copolymer with melt flow rate greater than one or linear high density polyethylene with melt index greater than one;
    (b) layer B of polypropylene;
    (c) layer C of deformable random copolymer which is sufficiently deformable under heat seal conditions, said deformable random copolymer being selected from ethylene-propylene copolymer, ethylene-propylenebutene-1 terpolymer, propylene-butene copolymer, and mixtures thereof; and
    (d) layer D of heat sealable polymer with a melting point equal to lower than layer C polymer, said heat sealable polymer being selected from ethylene-propylene copolymer, ethylene-propylene-butene-1 terpolymer, propylene-butene copolymer, and mixtures thereof,
    wherein layer C is thicker than layer D, wherein layer D is loaded with antiblocking agent comprising non-distortable organic polymer particles having an average particle size greater 6 microns; and wherein the film layer order is A/B/C/D.

* * * * *